March 3, 1959 — V. W. HAIR — 2,875,778
AUTOMATIC VALVE
Filed Dec. 18, 1956

Vincent W. Hair
INVENTOR.

United States Patent Office 2,875,778
Patented Mar. 3, 1959

2,875,778

AUTOMATIC VALVE

Vincent W. Hair, Kaplan, La.

Application December 18, 1956, Serial No. 629,011

10 Claims. (Cl. 137—386)

This invention relates in general to new and useful improvements in valve construction, and more specifically to an improved automatic valve for use in maintaining a constant level in tanks and the like.

The primary object of this invention is to provide an automatic valve for use in filling and maintaining a level in tanks, the valve being so constructed whereby it is self contained and requires the use of no auxiliary mechanism such as floats or the like.

Another object of this invention is to provide an improved valve for controlling the filling of tanks and the like and maintaining a constant level therein, the valve being so constructed whereby it has a snap action and is either in an opened or a closed position, the valve being so constructed that it has no intermediate position.

A further object of this invention is to provide an improved automatic valve, the automatic valve including a first valve assembly for controlling the flow of a liquid through the automatic valve, and a second valve assembly for controlling the operation of the first valve assembly.

A still further object of this invention is to provide an automatic valve for filling and maintaining constant levels in tanks and the like, the automatic valve being formed of readily obtainable materials whereby the manufacture thereof is economically feasible and having relatively few moving parts whereby no maintenance is required and the life of the automatic valve is practically indefinite.

These together with other objects and advantages which will become subsequently apparent reside in the details of construction and operation as more fully hereinafter described and claimed, reference being had to the accompanying drawing forming a part thereof, wherein like numerals refer to like parts throughout, and in which:

Figure 1:
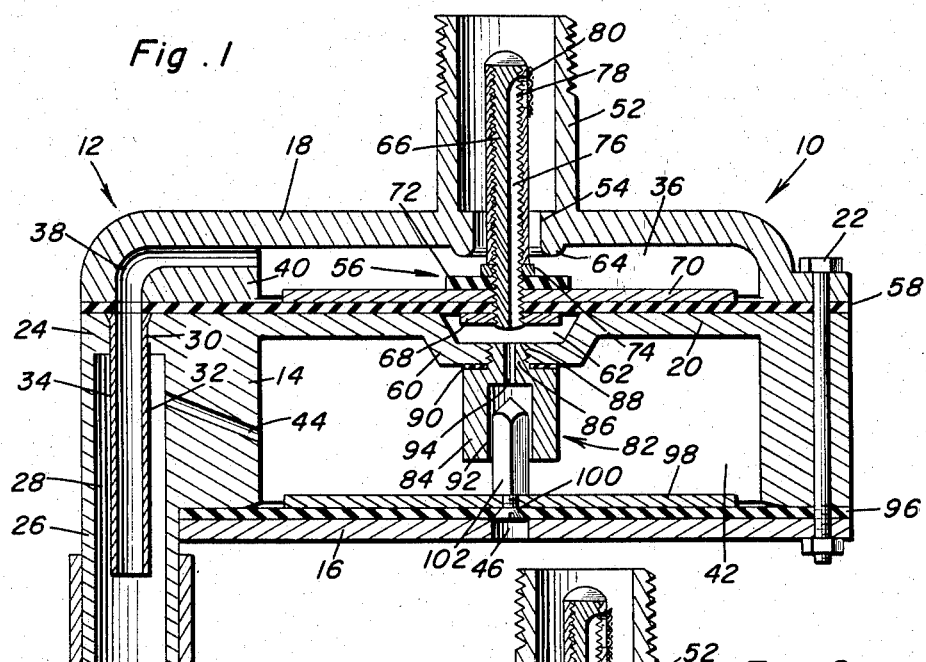
Figure 1 is a sectional view taken through the automatic valve which is the subject of this invention and shows the valve in an opened position permitting the flow of water or other liquids therethrough.

Referring now to the drawings in detail, it will be seen that there is illustrated the valve which is the subject of this invention, the automatic valve being referred to in general by the reference numeral 10. The automatic valve 10 includes a housing which is referred to in general by the reference numeral 12. The housing 12 is formed on an annular body portion 14 which has the lower end thereof closed by a bottom wall 16 and the upper end thereof has mounted thereon a dished top wall 18. The body portion 14 also includes a partition wall 20 adjacent the upper edge thereof. The bottom wall 16 and the top wall 18 are secured to the body portion 14 by a circumferentially spaced fasteners 22.

It is to be noted that the body portion 14 has a thickened part 24 which terminates in a downwardly extending discharge pipe 26 which is disposed to one side of the bottom wall 16. The discharge pipe 26 includes a relatively large discharge passageway 28. The discharge passageway 28 terminates below the upper edge of the body portion 14 in a reduced bore 30. Seated in the reduced bore 30 and extending downwardly into the discharge pipe 26 is a secondary discharge pipe 32 having a reduced discharge passageway 34.

The inside of the top wall 18 is spaced above the partition wall 20 to form a first compartment 36 which will be considered an upper compartment. The upper compartment 36 is communicated with the reduced discharge passageway 34 by means of a discharge passageway 38 formed in a thickened wall portion 40 of the top wall 18.

Formed within the body portion 14 is a second or lower compartment 42 which is defined by the partition wall 20 and the bottom wall 16. The lower compartment 42 is communicated with the discharge passageway 28 by means of an upwardly and outwardly sloping vent opening 44 which opens into the discharge passageway 28 intermediate the ends of the discharge pipe 32. A vent opening 46 is also formed in the central portion of the bottom wall 16.

In order that water may be conveyed to a tank or the like which is being filled, there is secured to the lower part of the discharge pipe 26 a hose or other water supply member 48. The hose 48 terminates at its lower end in a specially cut end 50. The end 59 is so formed whereby the lower end of the hose 48 is normally closed by water within a tank (not shown) and the surface tension of the water within the tank continues to permit the water to close the lower end of the hose 48 even though the water has dropped below the end 50 whereby once the surface tension is released, the hose 48 will be immediately opened to the atmosphere.

In order that water may be supplied to the automatic valve 10, there is provided an inlet fitting 52. The inlet fitting 52 is carried by the top wall 18 and is communicated with the interior of the upper compartment 36 by means of an inlet opening 54 formed in the top wall 18.

In order that the inlet opening 54 may be closed when desired, there is disposed within the upper compartment 36 a first valve assembly which is referred to in general by the reference numeral 56.

The first valve assembly 56 includes a first diaphragm 58 which is clamped between the top wall 18 and the upper surface of the body portion 14, the diaphragm normally overlying the partition wall 20. The partition wall 20 is recessed as at 60 to form a pocket 62 beneath the central portion of the diaphragm 58.

The first valve assembly 56 also includes a first valve seat 64 which is formed on the underside of the top wall 18 and surrounds the inlet opening 54. Extending up into the inlet fitting 52 through the inlet opening 54 is a tubular member 66. The tubular member 66 is externally threaded and passes down through the diaphragm 58. Threadedly engaged in the lower end of the tubular member 66 is a first lock nut 68. Overlying the diaphragm 58 and reinforcing the diaphragm 58 is a plate 70 which is threadedly engaged with the tubular member 66. Overlying the plate 70 is a first valve member 72 which is held in place by a nut 74 threadedly engaged with the tubular member 66. The nut 74 is of a size to pass up into the inlet opening 54 and clear the first valve seat 64.

The tubular member 66 is provided with a bore 76 which opens through the lower end thereof. The bore 76 also includes an inlet opening 78 disposed adjacent the upper end thereof, the inlet opening 78 being covered by a strainer screen 80. The bore 76 communicates with the interior of the inlet fitting 52 with the pocket 62 beneath the first diaphragm 58.

Disposed in the lower compartment 42 is a second valve assembly which is referred to in general by the reference numeral 82. The second valve assembly 82 includes a fitting 84 having a reduced externally threaded upper portion 86 which is threadedly engaged in an internally threaded bore 88 formed in the recess portion 66. The fitting 84 is sealed with respect to the partition wall 20 by means of a gasket 90.

The lower part of the fitting 84 includes an enlarged bore 92 which opens down through the lower end of the fitting 84. The bore 92 has a reduced extension 94 which opens through the upper end of the fitting 84. Thus the bores 92 and 94 communicate the pocket 62 with the lower compartment 42.

Disposed in the bottom part of the lower compartment 42 is a second diaphragm 96 which is clamped against the body portion 14 by the bottom wall 16. The diaphragm 96 is reinforced by a plate 98 which is secured thereto by a suitable fastener 100. The fastener 100 also secures to the diaphragm 96 a second valve member 102 which is of the needle valve type. The needle valve member 102 engages that portion of the fitting 84 surrounding the lower end of the bore 94 so as to seal the bore 94.

In the normal operation of the automatic valve 10, water or other liquid which is to be controlled by the automatic valve 10 will flow into the inlet fitting 52 and down into the upper compartment 36. The liquid will then flow out through the bore 38 down into the reduced discharge passageway 34 and into the main discharge passageway 28. The flowing of water through the passageways 28 and 34 will result in the formation of a vacuum around the upper part of the reduced discharge pipe 32 and as a result a vacuum will be formed in the lower compartment 42. The formation of a vacuum in the lower compartment 42 will result in an upward movement of the second diaphragm 96 and as a result the valve member 102 will move upwardly to close the bore 94.

Normally water or other liquids flow down into the pocket 62 and into the lower compartment 42 through the bore 76 and the bore 94. However, once the bore 94 is closed, then the water flowing into the pocket 62 under pressure will cause an upward movement of the diaphragm 58 and the valve member 72. The valve member 72 will then close the inlet opening 54 and shut off the flow of liquid through the automatic valve 10.

Figure 2:
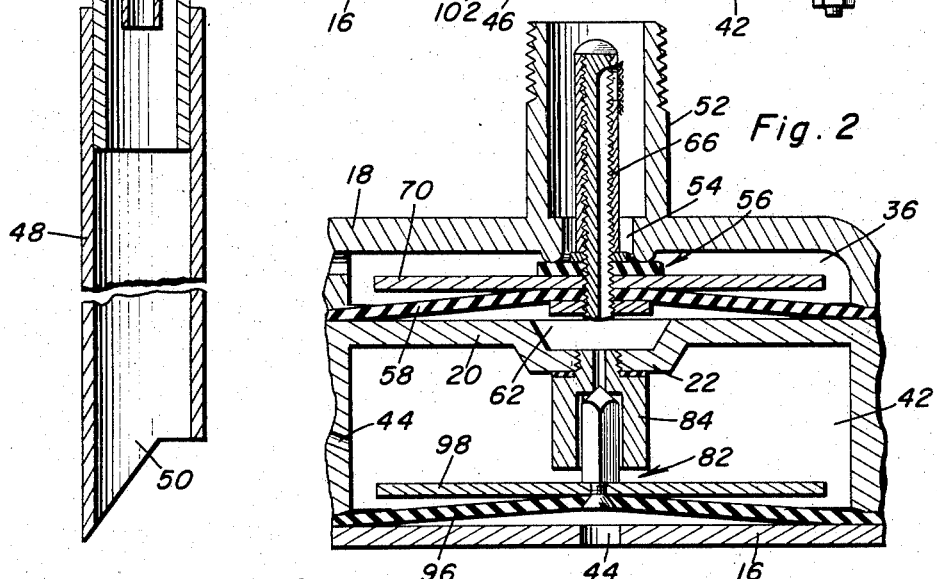
Figure 2 is a fragmentary sectional view of the valve of Figure 1 and shows the two valve assemblies thereof in closed position.
Figure 3:
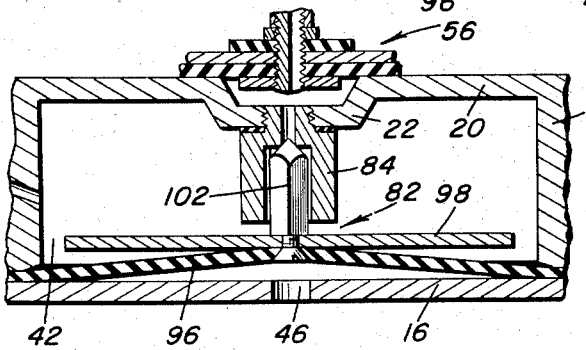
Figure 3 is a fragmentary sectional view of the valve of Figure 1 and shows the second valve thereof in a closed position while the first valve assembly thereof is permitted to be in an open position.

Once the inlet opening 54 is closed, the liquid will flow down out of the hose 48. Should the liquid flow entirely out of the hose 48, as it will in the event a tank is not filled to the desired level, then the hose 48, the discharge passageway 28 and the vent opening 44 will be communicated with the atmosphere as a result of which pressure within the lower compartment 42 will be that of the atmosphere and the diaphragm 96 will return to its position of Figure 1 from its position of Figures 2 and 3. When this happens, the liquid disposed within the pocket 62 will be permitted to flow down into the lower compartment 42 permitting the first diaphragm 58 to return to its normal position. The return of the diaphragm 58 to its normal position will result in the downward movement of the valve member 72 and the opening of the inlet opening 54.

Once the inlet opening 54 opens, water or other liquid is again permitted to flow through the automatic valve 10. This cycle continues until the tank or other receptacle is filled to the desired level.

The desired level within the tank being filled using automatic valve 10 will be controlled by the position of the lower end 50 of the hose 48. When the water dispensed by the automatic valve 10 is sufficient to raise the level within the tank so as to seal the lower end of the hose 48, then until such time as the level in the tank is lowered to open the lower end of the hose 48, a vacuum will remain within the lower compartment 42 and the second valve assembly 82 will remain in a closed position. Inasmuch as the second valve assembly 82, when in a closed position, results in the closing of and the maintenance of the closed position of the first valve assembly 56, it will be readily apparent that additional liquid will not be dispensed by the automatic valve 10 until the level in the tank has been reduced to a position below the lower end of the hose 48.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An automatic valve comprising a housing including a body portion, a bottom wall, a top wall, and a partition wall disposed intermediate said top wall and said bottom wall dividing said housing into upper and lower compartments, a discharge passageway in said body portion communicated with said upper compartment, a port communicating said lower compartment with said discharge passageway, an inlet fitting on said top wall, a first valve seat on said top wall to effect the closing of said inlet fitting, a first diaphragm mounted in said upper compartment, a first valve member carried by said first diaphragm for engaging said first valve seat, a pocket beneath said first diaphragm, a tubular member passing through said first diaphragm and communicating said pocket with said inlet fitting, a flow passageway through said partition wall communicating said pocket with said lower compartment, a second valve seat surrounding said flow passageway, a second diaphragm disposed in said lower compartment, and a second valve member carried by said second diaphragm for engaging said second valve seat.

2. An automatic valve comprising a housing including a body portion, a bottom wall, a top wall, and a partition wall disposed intermediate said top wall and said bottom wall dividing said housing into upper and lower compartments, a discharge passageway in said body portion communicated with said upper compartment, a port communicating said lower compartment with said discharge passageway, an inlet fitting on said top wall, a first valve seat on said top wall to effect the closing of said inlet fitting, a first diaphragm mounted in said upper compartment, a first valve member carried by said first diaphragm for engaging said first valve seat, a pocket beneath said first diaphragm, a tubular member passing through said first diaphragm and communicating said pocket with said inlet fitting, a flow passageway through said partition wall communicating said pocket with said lower compartment, a second valve seat surrounding said flow passageway, a second diaphragm disposed in said lower compartment, a second valve member carried by said second diaphragm for engaging said second valve seat, and a vent passageway in said bottom wall whereby the underside of said second diaphragm is vented to the atmosphere.

3. An automatic valve comprising a housing including a body portion, a bottom wall, a top wall, and a partition wall disposed intermediate said top wall and said bottom wall dividing said housing into upper and lower compartments, a discharge passageway in said body portion communicated with said upper compartment, a port communicating said lower compartment with said discharge passageway, an inlet fitting on said top wall, a first valve seat on said top wall to effect the closing of said inlet fitting, a first diaphragm mounted in said upper compartment, a first valve member carried by said first diaphragm for engaging said first valve seat, a pocket beneath said first diaphragm, a tubular member passing through said first diaphragm and communicating said pocket with said inlet fitting, a flow passageway through said partition wall communicating said pocket with said lower compartment, a second valve seat surrounding said flow passageway, a second diaphragm disposed in said lower compartment, and a second valve member carried by said second diaphragm for engaging said second valve seat, said first diaphragm being disposed intermediate said body portion and said top wall and being clamped therebetween.

4. An automatic valve comprising a housing including a body portion, a bottom wall, a top wall, and a partition wall disposed intermediate said top wall and said bottom wall dividing said housing into upper and lower compartments, a discharge passageway in said body portion communicated with said upper compartment, a port communicating said lower compartment with said discharge passageway, an inlet fitting on said top wall, a first valve seat on said top wall to effect the closing of said inlet fitting, a first diaphragm mounted in said upper compartment, a first valve member carried by said first diaphragm for engaging said first valve seat, a pocket beneath said first diaphragm, a tubular member passing through said first diaphragm and communicating said pocket with said inlet fitting, a flow passageway through said partition wall communicating said pocket with said lower compartment, a second valve seat surrounding said flow passageway, a second diaphragm disposed in said lower compartment, and a second valve member carried by said second diaphragm for engaging said second valve seat, said second diaphragm being disposed intermediate said body portion and said bottom wall and being clamped therebetween.

5. An automatic valve comprising a housing including a body portion, a bottom wall, a top wall, and a partition wall disposed intermediate said top wall and said bottom wall dividing said housing into upper and lower compartments, a discharge passageway in said body portion communicated with said upper compartment, a port communicating said lower compartment with said discharge passageway, an inlet fitting on said top wall, a first valve seat on said top wall to effect the closing of said inlet fitting, a first diaphragm mounted in said upper compartment, a first valve member carried by said first diaphragm for engaging said first valve seat, a pocket beneath said first diaphragm, a tubular member passing through said first diaphragm and communicating said pocket with said inlet fitting, a flow passageway through said partition wall communicating said pocket with said lower compartment, a second valve seat surrounding said flow passageway, a second diaphragm disposed in said lower compartment, and a second valve member carried by said second diaphragm for engaging said second valve seat, said first diaphragm being disposed intermediate said body portion and said top wall and being clamped therebetween, said second diaphragm being disposed intermediate said body portion and said bottom wall and being clamped therebetween.

6. An automatic valve comprising a housing including a body portion, a bottom wall, a top wall, and a partition wall disposed intermediate said top wall and said bottom wall dividing said housing into upper and lower compartments, a discharge passageway in said body portion communicated with said upper compartment, a port communicating said lower compartment with said discharge passageway, an inlet fitting on said top wall, a first valve seat on said top wall to effect the closing of said inlet fitting, a first diaphragm mounted in said upper compartment, a first valve member carried by said first diaphragm for engaging said first valve seat, a pocket beneath said first diaphragm, a tubular member passing through said first diaphragm and communicating said pocket with said inlet fitting, a flow passageway through said partition wall communicating said pocket with said lower compartment, a second valve seat surrounding said flow passageway, a second diaphragm disposed in said lower compartment, a second valve member carried by said second diaphragm for engaging said second valve seat, a reduced discharge passageway in said top wall terminating concentrically of said first mentioned discharge passageway, and a discharge tube extending into said first mentioned discharge passageway.

7. An automatic valve comprising a housing including a body portion, a bottom wall, a top wall, and a partition wall disposed intermediate said top wall and said bottom wall dividing said housing into upper and lower compartments, a discharge passageway in said body portion communicated with said upper compartment, a port communicating said lower compartment with said discharge passageway, an inlet fitting on said top wall, a first valve seat on said top wall to effect the closing of said inlet fitting, a first diaphragm mounted in said upper compartment, a first valve member carried by said first diaphragm for engaging said first valve seat, a pocket beneath said first diaphragm, a tubular member passing through said first diaphragm and communicating said pocket with said inlet fitting, a flow passageway through said partition wall communicating said pocket with said lower compartment, a second valve seat surrounding said flow passageway, a second diaphragm disposed in said lower compartment, a second valve member carried by said second diaphragm for engaging said second valve seat, a reduced discharge passageway in said top wall terminating concentrically of said first mentioned discharge passageway, and a discharge tube extending into said first mentioned discharge passageway, said discharge tube extending below said port whereby a vacuum is produced in said port.

8. In an automatic valve, the combination of a housing having first and second compartments, first and second diaphragms provided in the respective compartments, an inlet and an outlet communicating with the first compartment at one side of the diaphragm therein, said housing being provided with a pocket at the other side of the diaphragm in the first compartment and also being provided with a passageway extending from said pocket to the second compartment, valve means for said inlet operatively connected to the first diaphragm, and valve means for said passageway operatively connected to the second diaphragm, said first mentioned valve means having an open bore communicating said inlet with said pocket, and a port communicating said second compartment with said outlet.

9. The device as defined in claim 8 wherein said port communicates with said second compartment at one side of the diaphragm therein, said second compartment being provided at the other side of the diaphragm therein with a vent communicating with the atmosphere.

10. The device as defined in claim 8 together with a discharge tube communicating with said first compartment and disposed concentrically in said outlet in spaced relation from the outlet wall, said port communicating with the space between the outlet wall and said discharge tube.

References Cited in the file of this patent

UNITED STATES PATENTS

| | | |
|---|---|---|
| 2,661,136 | Huisman | Dec. 1, 1953 |
| 2,762,389 | Frazer | Sept. 11, 1956 |